Patented Nov. 19, 1940

2,222,302

UNITED STATES PATENT OFFICE 2,222,302

SYNTHESIS OF ADIPIC ACID DINITRILE

Willi Schmidt and Friedrich Manchen, Ludwigshafen-on-the-Rhine, Germany, assignors, by mesne assignments, to General Aniline & Film Corporation, New York, N. Y., a corporation of Delaware No Drawing. Application August 15, 1939, Serial No. 290,232. In Germany August 26, 1938

4 Claims. (Cl. 260—464)

The present invention relates to a new synthesis of adipic acid dinitrile.

As initial materials for the preparation of the valuable adipic acid and the compounds adipic acid dinitrile and hexamethylene diamine obtainable therefrom, only cyclohexanol and cyclohexanone have hitherto been used technically. From the adipic acid obtained from these technically valuable initial materials, however, adipic acid dinitrile may be prepared only in unsatisfactory yields.

We have now found that a very satisfactory technical synthesis for the preparation of adipic acid dinitrile consists in preparing butine-2-diol-1,4 by the action of acetylene on formaldehyde, hydrogenating the butine-2-diol-1,4 to butanediol-1,4 converting the butane-diol-1,4 into a 1,4-halogen-butane and replacing the halogen atoms therein by cyano groups.

The first step of the new synthesis, namely the preparation of butine-2-diol-1,4 from formaldehyde and acetylene, is preferably effected by causing acetylene to act in the liquid phase on formaldehyde in the presence of acetylene compounds of heavy metals of the first and second group of the periodic system, preferably of a copper acetylene compound. The reaction is suitably carried out under superatmospheric pressure, the acetylene being applied to a solution of formaldehyde in water or an organic inert solvent together with inert gases such as nitrogen. The butine-2-diol-1,4 is thus obtained in a solution which may then be subjected to a catalytic hydrogenation without further isolation of the butine-2-diol-1,4.

The hydrogenation is preferably carried out by subjecting liquid butine-2-diol-1,4 or a solution thereof to the action of hydrogen under superatmospheric pressure in the presence of a hydrogenation catalyst capable of promoting the conversion of the triple linkage into a fully saturated linkage. Catalysts of this type are for example cobalt or nickel prepared from Raney-cobalt or -nickel, metallic nickel, cobalt, copper or silver applied to carriers such as pumice stone, fuller's earth, silicic acid gel, asbestos or aluminum oxide.

The hydrogenation may also be carried out continuously, for example by leading liquid or dissolved butine-2-diol with an excess of hydrogen under superatmospheric pressure through a tube charged with a hydrogenation catalyst.

The butanediol-1,4 obtained by the hydrogenation of butine-2-diol is then converted into a 1,4-dihalogenbutane. This may be done for example in one step by esterifying the hydroxyl groups by means of thionyl halide, in particular thionyl chloride. For example, liquid butanediol-1,4 may be admixed with the calculated amount or a slight excess of thionyl chloride, if desired in the presence of an inert solvent. The reaction usually starts at room temperature with the evolution of sulphur dioxide; it may be accelerated by gently heating until sulphur dioxide is no longer evolved.

The conversion of butanediol-1,4 into a 1,4-dihalogenbutane may also be carried out in several steps by first converting the butanediol-1,4 into tetrahydrofurane, treating tetrahydrofurane with hydrogen halide, in particular hydrogen chloride, to produce 1-halogen-4-hydroxybutane, and esterifying the latter with a hydrogen halide to form 1,4-dichlorbutane.

The conversion of the 1,4-halogen-butanes into adipic acid dinitrile is effected in known manner, as for example by heating with alkali metal or alkaline earth metal cyanides in a suitable solvent.

By the new method adipic acid dinitrile may be prepared from the initial materials formaldehyde and acetylene which are cheap and readily accessible in any desired amounts. The single stages of the synthesis may also be carried out on a large scale with very good yields, so that both the yield of adipic acid and of hexamethylene diamine obtained by hydrogenation of the dinitrile, with reference to formaldehyde and acetylene, is excellent.

The following example will further illustrate how the said invention may be carried out in practice but the invention is not restricted to this example. The parts are by weight unless otherwise specified.

Example 50 parts of 30 per cent aqueous formaldehyde solution are charged together with a catalyst consisting of 1 part of copper acetylide and 0.15 part of silver acetylide on 2 parts of fuller's earth into a stirring pressure vessel and a mixture of acetylene and nitrogen in the volumetric ratio of 2:1 is led in at 100° C. under 25 atmospheres' pressure, acetylene being subsequently pressed in until no more is absorbed. After separating the catalyst there is thus obtained about a 35 per cent aqueous solution of butine-2-diol-1,4 (in a yield of about 90 per cent of the theoretical yield), of which 300 parts by volume per hour are pumped through a vertical vessel containing 1900 parts by volume of a nickel catalyst applied to pumice stone. The hydrogen serving for hydrogenation is under a pressure of 200 atmospheres; it is led in circulation at a reaction temperature of 50° C. By distilling the final solution there is obtained pure butane-diol-1,4 in a 97 per cent yield. 90 parts of the latter are allowed to flow slowly at ordinary temperature while stirring continuously into 260 parts of thionyl chloride. The mixture is then gradually heated to 80° C. and kept at this temperature until the evolution of gas ceases. By distillation there are obtained 116 parts of 1,4-dichlorbutane, corresponding to a yield of 90 per cent of the theoretical yield. This product is dissolved in an equal amount of methanol and heated to 150° C. together with 110 parts of commercial sodium cyanide in a stirring pressure vessel. The reaction is completed after 5 hours. From the reaction mixture, after filtering off the sodium chloride formed, adipic acid dinitrile is obtained in an 87 per cent yield by distillation.

What we claim is:

1. A process for the synthesis of adipic acid dinitrite which consists in preparing butine-2-diol-1,4 by the action of acetylene on formaldehyde, hydrogenating the butine-2-diol-1,4 to butanediol-1,4, converting the butanediol-1,4 into a 1,4-dihalogenbutane and replacing therein the halogen atoms by cyano groups.

2. A process for the synthesis of adipic acid dinitrile which consists in preparing butine-2-diol-1,4 by the action of acetylene on formaldehyde in the liquid phase in the presence of copper acetylide, hydrogenating the butine-2-diol-1,4 to butanediol-1,4, converting the butanediol-1,4 into a 1,4-dihalogenbutane and replacing therein the halogen atoms by cyano groups.

3. A process for the synthesis of adipic acid dinitrile which consists in preparing butine-2-diol-1,4 by the action of acetylene on an aqueous solution of formaldehyde in the presence of copper acetylide, hydrogenating the butine-2-diol solution to a solution of butanediol-1,4, isolating the butanediol-1,4, converting the butanediol-1,4 into a 1,4-dihalogenbutane and replacing therein the halogen atoms by cyano groups.

4. A process for the synthesis of adipic acid dinitrile which consists in preparing butine-2-diol-1,4 by the action of acetylene on an aqueous solution of formaldehyde in the presence of copper acetylide, hydrogenating the butine-2-diol solution to a solution of butanediol-1,4, isolating the butanediol-1-4, treating the butanediol-1,4 in the liquid phase with thionyl chloride, isolating the 1,4-dichlorbutane and replacing therein the halogen atoms by cyano groups.

WILLI SCHMIDT.
FRIEDRICH MANCHEN.